Aug. 21, 1945.　　　P. W. GAENSSLE　　　2,383,376
BRAKE ARRANGEMENT
Filed Aug. 24, 1944　　　3 Sheets-Sheet 2

INVENTOR.
Paul W. Gaenssle
BY
John P. Tarbox
ATTORNEY

INVENTOR.
Paul W. Gaenssle
BY
ATTORNEY

Patented Aug. 21, 1945

2,383,376

UNITED STATES PATENT OFFICE 2,383,376

BRAKE ARRANGEMENT

Paul W. Gaenssle, Detroit, Mich., assignor to Budd Wheel Company, Philadelphia, Pa., a corporation of Pennsylvania Application August 24, 1944, Serial No. 550,957

10 Claims. (Cl. 188—59)

The invention relates to a brake arrangement for vehicles, such as railway trucks, and particularly to such an arrangement in which most of the actuating mechanism for the brakes is sealed within a closed casing which protects it from dirt and water.

It is an object of the invention to simplify a brake arrangement of this class, to facilitate its manufacture and reduce costs, to make the parts readily accessible for renewal or repair, to provide effective sealing means between movable parts extending through openings in the casing and said openings, to provide a simplified combined hand operation and fluid-operation for the brake and further to generally improve the arrangement to make the dimension of the casing longitudinally of the vehicle as small as possible, and to generally facilitate the assembly and disassembly of the parts entering into the structure. In other words, the general object is to make a highly practical arrangement, both for manufacture and use, and one which is light in weight and compact for the ruggedness required in this type of brake and which effects a saving in first cost and in the cost of servicing and operation.

The manner in which these and other objects and advantages are attained will become apparent from the following detailed description when read in connection with the drawings forming a part of this specification.

Figure 1:
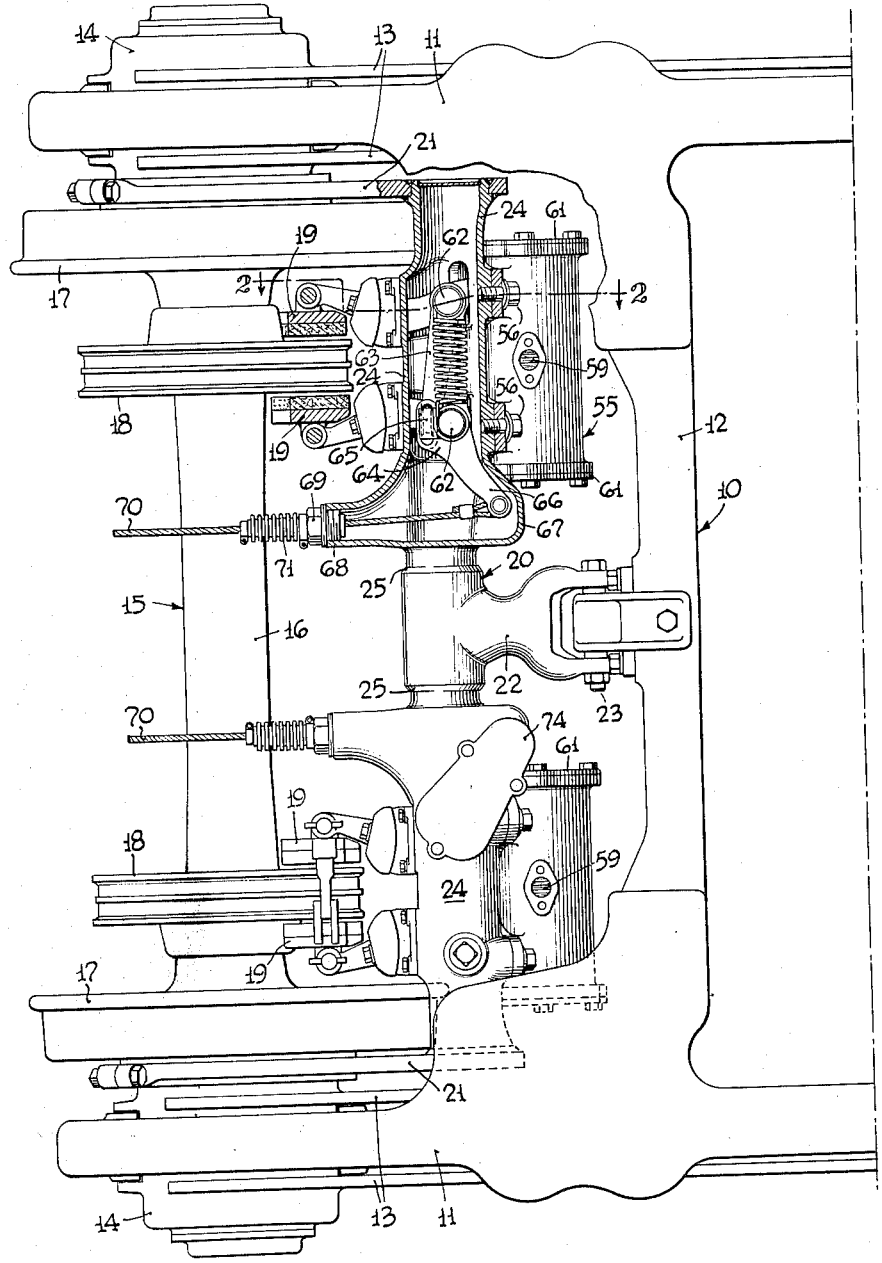
Fig. 1 is a plan view of one-half of a railway truck showing the brake arrangement of the invention applied thereto, parts being broken away and shown in horizontal section.

The invention is shown applied to a railway truck having a frame 10 comprising side members 11 and interconnecting transoms, as 12. The truck frame is supported in the usual way through springs (not shown) from the equalizer bars 13 which in turn rest on the journal boxes, 14, of the wheel and axle assemblies, as 15. Each assembly comprises an axle 16 journalled at its ends in the respective journal boxes 14, and wheels 17. With each of the wheels 17 is associated, to rotate therewith, a rotary brake disc, as 18. A pair of brake shoes, as segmental shoes 19, 19 is arranged to cooperate with the opposite faces of each disc.

It is to the support means for the shoes and the actuating mechanism therefor that the invention is principally directed.

As shown, the support means comprises principally a transverse beam, designated generally by 20, extending transversely adjacent the peripheries of the discs 18, and supported, in the embodiment shown, at its ends by the longitudinally extending arms 21 from the respective journal boxes in a manner well known in the art. Intermediate its ends the beam 20 has an inwardly extending arm 22 supported from the adjacent transom by a connection 23 fully shown and described in co-pending application, Serial No. 541,773, filed June 23, 1944. Since the particular manner of support of the transverse beam 20 from the truck forms no part of the present invention, and can be widely varied, further description of the particular embodiment shown need not be given.

As shown, the hollow tubular beam 20 has adjacent each end thereof a portion designated generally by numeral 24, which extends from the end of the beam inwardly past the adjacent disc to the joint 25 where it is welded to a center section carrying the arm 22.

This end portion 24 is of irregular form, as shown by the various sections, its sectional form varying at various points along its length, but its outer walls merge continuously into each other throughout tis length to form a closed hollow section. At opposite sides of the adjacent disc the section is that shown in Fig. 6. In these regions, the section is vertically deeper than its longitudinal dimension, and the hollow beam here is comprised of a substantially vertical front wall 26, an inclined rear wall 27, and top and bottom walls 28 and 29, respectively. The front wall is extended downwardly by an extension 30 below the bottom wall 29.

Figure 2:
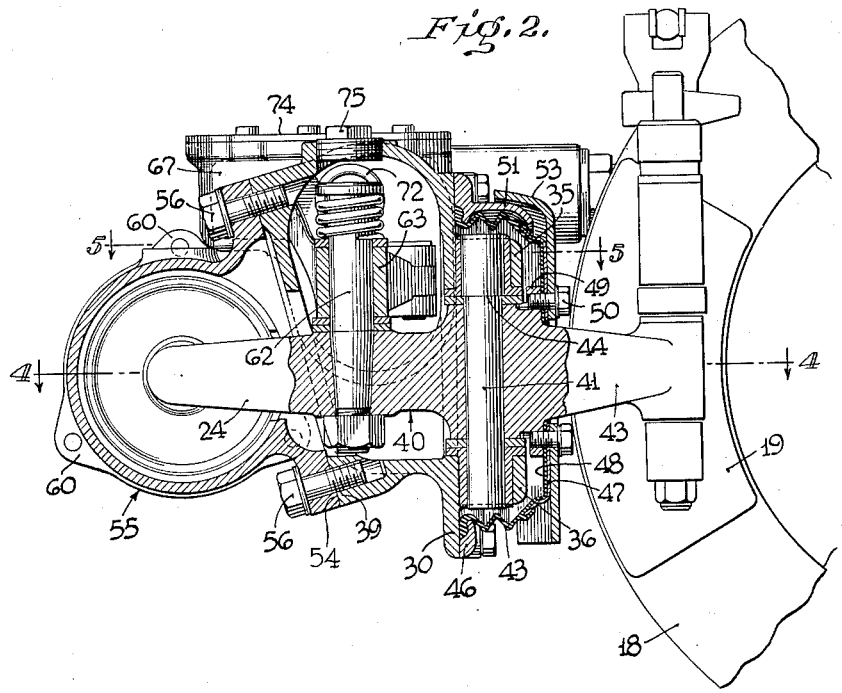
Fig. 2 is a vertical longitudinal sectional view through the brake support, on an enlarged scale, the section being taken substantially along the line 2—2 of Fig. 1, parts being shown in elevation.
Figure 3:
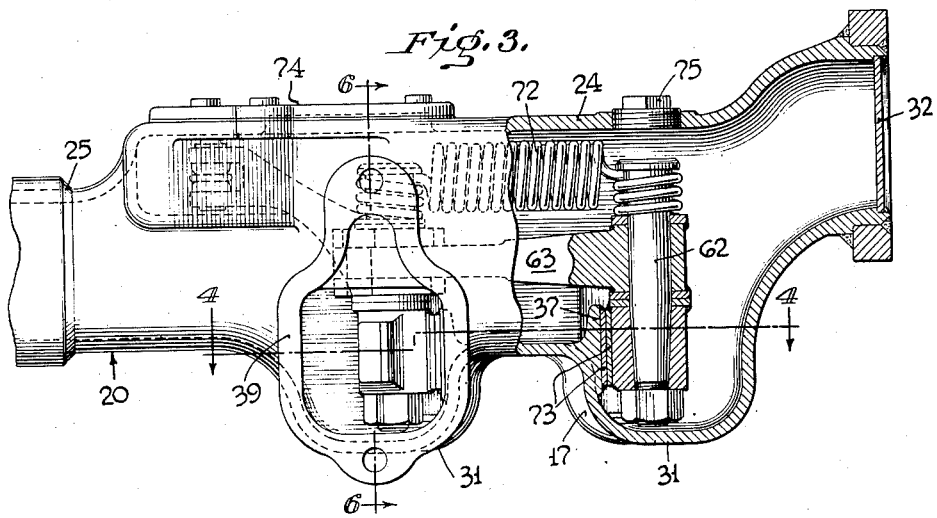
Fig. 3 is a fragmentary elevational view of one end of the support, looking from the center of the truck toward the axle, the cylinder being removed in this view and parts of the support being broken away and shown in section.

At the location of each of these spaced vertically deepened regions formed by the depending bulges 31 and 32, see Fig. 3, the front and rear walls 26 and 27 are provided with generally longitudinally aligned openings 33 and 34, respectively. Above and below each opening 33 in the front wall 26 are provided spaced vertically aligned bearings 35 and 36 integral with and projecting outwardly from said wall, see Figs. 2 and 6. Also, along adjacent sides of the openings in the rear wall are formed integral inwardly projecting abutments 37, Figs. 3, 4, and 6.

Figure 4:
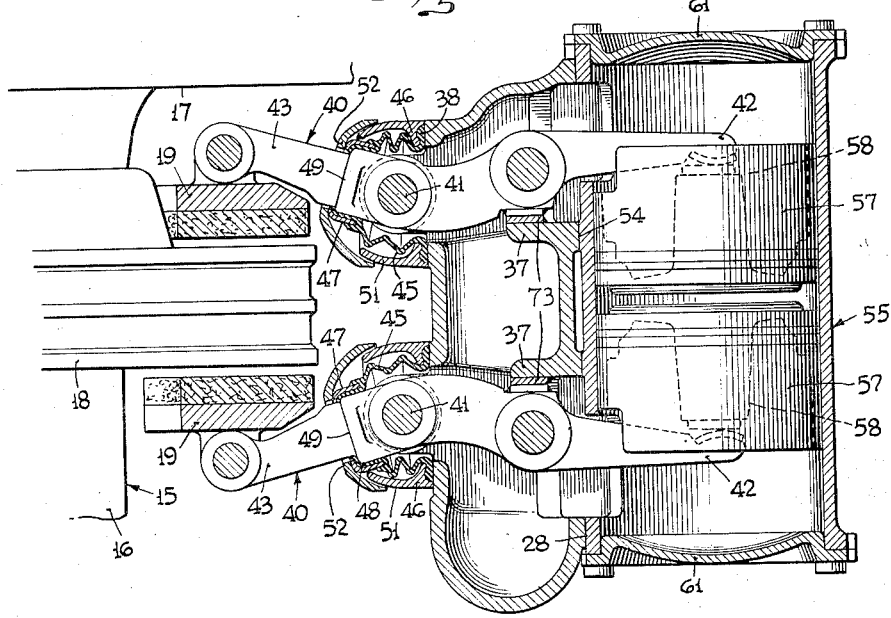
Fig. 4 is a horizontal sectional view taken substantially along the line 4—4 of Figs. 2 and 3.
Figure 5:
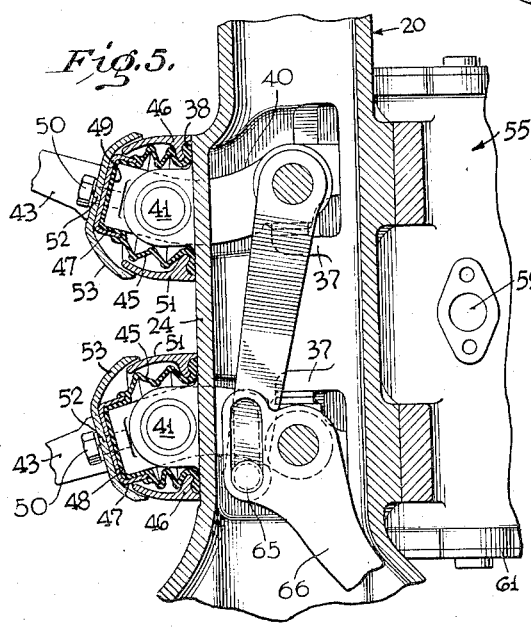
Fig. 5 is a similar sectional view taken substantially along the line 5—5 of Fig. 2.
Figure 6:
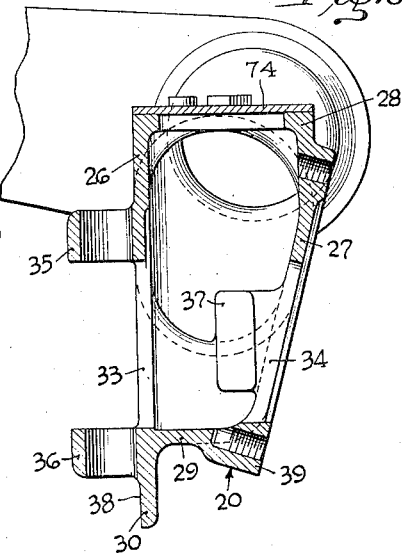
Fig. 6 is a vertical longitudinal section through the support beam per se, with the associated parts removed, the section being taken substantially along the line 6—6 of Fig. 3.

Around the forward wall openings 33 are machined flat faces 38, see Figs. 4, 5 and 6, extending not only around the openings but around the associated bearings as well. Around the openings in the rear wall are machined flat faces 39, Figs. 3 and 6, the machined faces of the adjacent openings being in the same plane.

So constituted each end section 24 of the beam 20 is now adapted to form with the parts to be associated therewith a closed sealed casing, since the ends are closed, Fig. 3, by an end plate 32 welded in place.

Brake levers, as 40, are pivoted through pins 41 in the respective vertically arranged pairs of bearings 35 and 36 and have their arms, as 42, extend through the associated openings 33 and 34 with their free ends extending some distance beyond the inclined rear wall 27. Other arms 43 of the levers project forwardly from their respective pivots and carry the respective brake shoes 19 in any suitable manner, but here shown as in copending application, Serial No. 529,730, filed April 6, 1944.

With this arrangement, it will be seen that the brake levers can readily be assembled with the beam section 24 by inserting the lever arms from the front through the respective aligned openings 33 and 34 until the hub portions of the levers are located between the respective top and bottom bearings, after the latter have been provided with suitable wear bushings, as shown, and driving the pivot pins 41, preferably having a press fit with the hubs of the respective levers into position from the top. If desired, to insure the pins against downward shifting, they may be formed with shoulders, as 44, Fig. 2.

According to the invention, a novel sealing means is provided to seal the opening 33 and the bearings associated with each lever 40. As shown, such means may comprise a rubber or other flexible boot 45 having its enlarged inner margin clamped between a corresponding recess in a continuous clamping plate 46 and the machined face 38. At its other margin the boot may be vulcanized to a thin metal plate, as 47, which is faced on its inner side with rubber or other sealing gasket 48 and clamped to shoulders 49 on the adjacent lever arm, as by bolts 50.

Thus, it will be seen that a tight sealed joint is formed between the boot and the machined seat 38 surrounding the adjacent bearings and opening and a similar sealed joint is made between the associated lever arm and the other margin of the boot.

To protect the boot 45 against flying ballast, sand, etc., a metallic guard is provided for covering the boot against injury. This metallic guard is conveniently made in two parts, one part being formed by a curved extension 51 integral with the clamping plate 46 and the other being formed by a plate 52 flattened in a region surrounding an opening therein receiving the adjacent lever arm 43 and having curved extensions 53 closely fitting but preferably not touching the curved extension 51 of the associated plate 46.

Preferably, the plate 52, 53 is extended downwardly well below the lower portion of the boot, see Fig. 2, but the space at the bottom is left open, to allow sand, grit, or the like, if any should enter between the top and side portions of the guard parts, to fall down through the open bottom. The length and curvature of the curved parts is so chosen that the overlapping parts never leave each other in the movements of the lever. The metal plate 47 at the outer end of the boot protects the boot from injury by the fixed guard extensions 51, when the lever is turned to the extreme position shown in Fig. 5.

The rear openings 34 in the inclined support wall 27 are closed by machined faces 54 on a removable brake cylinder 55 fitting against the machined faces 39 surrounding said openings and clamped thereagainst by four clamping bolts, as 56, see Figs. 1 and 2. The cylinder 55 and pistons 57 movable therein are each formed with openings to permit the passage of the free ends of the lever arms 42 into the cylinder when the latter is assembled, with their ends in abutting relation with central bosses 58 on the respective pistons. If desired, for a positively sealed joint, gaskets (not shown) may be inserted between the seats 39 and the associated seats 54 on the cylinder before the latter is clamped in place by the bolts 56.

The cylinder has a port 59, Figs. 1 and 5, leading to the space between the pistons and usual means for attaching a fluid pressure line (not shown) to esablish communication between it and the port.

At its ends the main body of the cylinder may be provided with spaced lugs, as 60, Fig. 2, to which removable end covers 61 may be bolted. Again, suitable gaskets may be provided in these joints to tightly seal them.

With the arrangement of parts, as shown, the longitudinal dimension of the support as an ensemble is compressed into as small a space as possible, while at the same time the parts can be readily assembled and disassembled so that they are at all times readily accessible.

Where manual or emergency actuation of the brake levers is desired, in addition to the fluid actuation, with this arrangement provision is readily made for it.

As appears in Figs. 2 and 3 the lever arms 41 extend through the lower portion of the vertically deep portions of the support beam 24 in the region of the downward bulges 31 and 32. This leaves above the levers sufficient space to house the emergency operating means now to be described together with the return spring.

To each lever arm, as 42, is fitted a vertically extending headed pivot pin, 62, the lower end of which has a taper fitting a tapered hole in the lever arm and the pin is drawn to its tapered seat by a nut threaded on its lower screw threaded end. The assembly of these pins and the associated parts can be readily effected prior to the mounting of the brake cylinder 55 in place.

The pin associated with each arm extends above the lever a substantial distance and has pivotally mounted thereon, in the case of one lever arm, the link 63, and in the case of the other lever arm the bell crank lever 64. The link 63 and the short arm of the bell crank lever are connected by a slot and pin connection 65, to permit lost motion and allow operation of the levers by the cylinder without affecting the manual or emergency operating means.

The long arm 66 of the bell crank 64 is extended laterally and upwardly into an upper longitudinally widened portion 67 of the beam portion 24, this widened portion providing space for the amplitude of swing of the lever.

The widened portion 67 has forward extension 68 closed by a perforated plug 69, through which is extended the operating cable 70, secured to the free end of the arm 66 of the bell crank 64. To seal the opening in plug 69 through which the cable passes an elongated corrugated flexible boot 71, made of rubber or the like, is tightly clamped at its opposite ends to the cable and the plug, respectively.

It will be understood that the cables 70 associated with the brake mechanism of the discs 18 adjacent the opposite ends of the axle 16 are connected in a usual manner by an equalizer to the manual operating means (not shown) so that when the manual or emergency means is operated, the braking force will be equalized between the respective discs. The lever, link connection between the levers carrying the respective shoes equalizes the pressure pressure on opposite sides of the associated disc. To return the brake levers 40 to their inoperative positions a tensioned coil spring 72 is provided. This spring may conveniently have its ends coiled at right angles to the main body of the spring and wound around the pins 62 carried by the respective lever arms 42 and compressed between the heads thereof and the associated lever 64 or link 63 to keep these parts from rattling.

In their inoperative position, the lever arms 62 are held against the respective abutments 37 and suitable opposed wear plates, as 73, may be secured, respectively, to the associated lever arm and abutment.

As shown in Figs. 1, 3, and 6, an access opening may be provided extending over the bell-crank lever 64 and its connections to the adjacent brake lever arm 42 and link 63, the opening being normally closed by a plate 74. Similarly, to provide convenient access for the insertion or removal of the right hand pin 62, Fig. 3, a screw-threaded opening is provided in the top wall of portion 24, this opening being normally closed by a screw plug 75.

From the foregoing description it is believed that the operation of the brake, either manually or by fluid pressure, is perfectly apparent and further description of its operation would be surplusage. It is also evident that the arrangement shown provides a very compact and rugged construction in which most of the movable parts are sealed within a closed housing. On the other hand, the housing is so constituted that the pistons are accessible without removing the cylinder, or the entire cylinder can be readily removed and replaced. The assembly of the brake levers and the parts associated therewith is facilitated and accessibility is readily had to all enclosed parts whenever desired.

While a specific embodiment of the invention has been herein described it will be understood that changes and modifications may be made by those skilled in the art without departing from the main features of the invention, and such changes and modifications are intended to be covered by the appended claims.

What is claimed is:

1. In a brake arrangement for vehicles, a rotary brake disc, a pair of brake shoes cooperating therewith, and support means for said shoes comprising a transverse beam having portions thereof adjacent said disc provided with vertically deep front and rear walls interconnected by top and bottom walls together forming a closed hollow cross-section, said portion having spaced pairs of longitudinally aligned openings in said front and rear walls, vertically spaced bearings on said front wall above and below the respective openings therein, brake levers extending through the respective pairs of longitudinally aligned openings, pivoted in the respective bearings and carrying the respective shoes, removable means sealing the openings in the front wall in a manner to permit the necessary movement of said levers, and a removable brake cylinder sealing the openings in the rear wall and receiving the adjacent ends of the brake levers therein for actuation thereby.

2. In a brake arrangement for vehicles, a rotary brake disc, a pair of brake shoes cooperating therewith, and support means for said shoes comprising a transverse beam enlarged opposite the disc to form a closed casing having a front wall provided with spaced openings, vertically spaced bearings on said front wall above and below the respective openings therein, brake levers having pivot pins engaging said bearings and having arms extending from their pivot pins within the casing and other arms extending without the casing for the support of the respective shoes, flexible sealing means for the bearings of the respective levers and the associated front wall opening, and a metallic guard for said flexible sealing means extending around the top and sides of an opening and the associated bearing, said guard being in two sections, one secured to the front wall and the other to an associated lever, said sections being extended to overlap in their free margins in all positions of the associated lever.

3. In a brake arrangement for vehicles, a rotary brake disc, a pair of brake shoes cooperating therewith, and support means for said shoes comprising a transverse beam having a portion thereof adjacent said disc provided with vertically deep front and rear walls interconnected by top and bottom walls together forming a closed hollow cross-section, said portion having spaced pairs of longitudinally aligned openings in said front wall above and below the respective openings therein, brake levers extending through the respective pairs of longitudinally aligned openings, pivoted in the respective bearings and carrying the respective shoes, removable means sealing the openings in the front wall in a manner to permit the necessary movement of levers, a removable brake cylinder sealing the openings in the rear wall and receiving the adjacent ends of the levers for actuation thereby, a return spring connecting the levers within the casing, and manually actuated means for the levers within the casing comprising a link pivoted to one lever, a bell-crank lever pivoted to the other lever and engaging said link through one arm thereof, the other arm of said bell crank extending laterally, a longitudinally widened top portion of the casing receiving said lever, and a cable secured to said arm and extending through an opening in the front wall of said longitudinally widened portion, and means for sealing the opening through which said cable extends.

4. In a brake arrangement for vehicles, a rotary brake disc, a brake shoe in cooperative relation to said disc, and support means for said shoe comprising a transverse beam provided with a closed hollow casing portion adjacent said disc, and having a substantially vertically extending front wall provided with an opening therethrough, bearings above and below said opening projecting forwardly from said wall and a brake lever carrying said shoe, pivoted intermediate its ends in said bearings and extending through said opening for coaction with an actuator.

5. In a brake arrangement for vehicles, a rotary brake disc, a brake shoe in cooperative relation to said disc, and support means for said shoe comprising a transverse beam provided with a closed hollow casing portion adjacent said disc and having a substantially vertically extending front wall and a rear wall, said walls formed with generally longitudinally aligned openings, bearings on said front wall above and below said front wall opening, a brake lever carrying said shoe, pivoted intermediate its ends in said bearings and extending through said aligned openings, and a removable brake cylinder closing the opening in the rear wall and operatively connected with the free end of said lever.

6. In a brake arrangement for vehicles, a rotary brake disc, a brake shoe for coaction with said disc, and support means for said shoe comprising a transverse beam of hollow cross-section, at least adjacent said disc, and having a substantially vertically extending front wall provided with an opening therein, bearings above and below said opening projecting from said wall, a brake lever carrying said shoe, pivoted intermediate its ends in said bearings and extending through said opening for cooperation with an actuator, and a flexible boot sealing the space between a seat surrounding said opening and said bearings and the lever outwardly of said bearing.

7. In a brake arrangement for vehicles, a rotary brake disc, a brake shoe for cooperation with said disc, and support means for said shoe comprising a transverse beam of hollow cross-section, at least adjacent said disc, and having a substantially vertically extending front wall provided with an opening therein, bearings above and below said opening, a brake lever carrying said shoe, pivoted intermediate its ends in said bearings and extending through said opening for cooperation with an actuator, a flexible boot sealing the space between a seat surrounding said opening and said bearings and the lever outwardly of said bearing, and a metallic guard for said boot extending around at least the sides and top thereof, said guard comprising parts secured respectively to said front wall and said lever and having their free edges overlapping in all operative positions of said lever.

8. In a brake arrangement for vehicles, a rotary brake disc, a pair of brake shoes cooperating therewith, and support means for said shoes comprising a transversely extending hollow enclosed housing adjacent the disc, brake levers associated at one of the ends thereof with the respective shoes, pivoted intermediate their ends on the portion of the housing in proximity to the disc and having arms extending through the lower portion of the housing for coaction with an actuator and manual-actuating means for the levers, said manual means comprising a transversely extending link pivotally mounted on a vertical pin on one lever, a bell-crank lever connected to said link and pivotally mounted on a vertical pin on the other lever, and a return spring interconnecting the vertical pins on the respective levers.

9. In a brake arrangement for vehicles, a rotary brake disc, a pair of brake shoes cooperating therewith, and support means for said shoes comprising a transversely extending hollow enclosed housing adjacent the disc, brake levers associated at one of the ends thereof with the respective shoes, pivoted intermediate their ends on the portion of the housing in proximity to the disc and having arms extending through the lower portion of the housing for coaction with an actuator, and manual-actuating means comprising a transversely-extending link pivotally mounted on a vertical pin on one lever, a bell-crank lever connected to the link and similarly pivotally mounted on a vertical pin on the other lever, said pins extending some distance above the associated link and bell-crank lever and being shouldered at their upper ends, a coiled return spring having its ends connected to said extended portions of the pins by coiled end portions, respectively, under slight compression between the shoulders on the respective pins and the associated link and bell-crank lever, to keep these parts from rattling.

10. A brake arrangement for vehicles, comprising a rotary brake disc, a rotary brake shoe for cooperation therewith, and a support means for said shoe comprising a transverse hollow beam forming in the transverse region of the disc by a substantially vertical front wall, a slightly inclined rear wall and top and bottom wall interconnecting said front and rear walls, the front and rear walls being formed with longitudinally aligned openings, bearings carried by said front wall above and below the opening therein, a brake lever pivoted intermediate its ends in said bearings and extending generally horizontally from one end thereof, coacting with said shoe to the other end thereof, extending beyond said rear wall, and a brake cylinder actuator removably secured to and closing the opening in, said inclined rear wall and disposed in cooperative relation to said last-named end of the lever.

PAUL W. GAENSSLE.